F. H. BEACH.
ROTARY SCREEN.
APPLICATION FILED MAR. 30, 1918.

1,305,685. Patented June 3, 1919.

F. H. Beach
Inventor

UNITED STATES PATENT OFFICE.

FITCH H. BEACH, OF CHARLOTTE, MICHIGAN.

ROTARY SCREEN.

1,305,685.

Specification of Letters Patent.   Patented June 3, 1919.

Application filed March 30, 1918. Serial No. 225,813.

*To all whom it may concern:*

Be it known that I, FITCH H. BEACH, a citizen of the United States, residing at Charlotte, in the county of Eaton and State of Michigan, have invented a new and useful Rotary Screen, of which the following is a specification.

This invention relates to rotary screens particularly designed for use as gravel screens, one of the objects of the invention being to provide a screen having simple and efficient means whereby any material which might become lodged within the orifices in the screen will be knocked therefrom, thus maintaining the screen in a state of high efficiency at all times.

A further object is to provide a screen having a drum made up of hingedly mounted apertured plates adapted to shift during the rotation of the screen thus to dislodge any adhering material.

Another object is to provide a screen which is simple and durable in construction and will not readily get out of order.

With the foregoing and other objects in view which will appear as the description proceeds, the invention consists of certain novel details of construction and combinations of parts which will be hereinafter more fully described and pointed out in the claims, it being understood that various changes may be made within the scope of the appended claims without departing from the spirit of the invention.

In the accompanying drawings the preferred form of the invention has been shown.

In said drawings—

Figure 1:
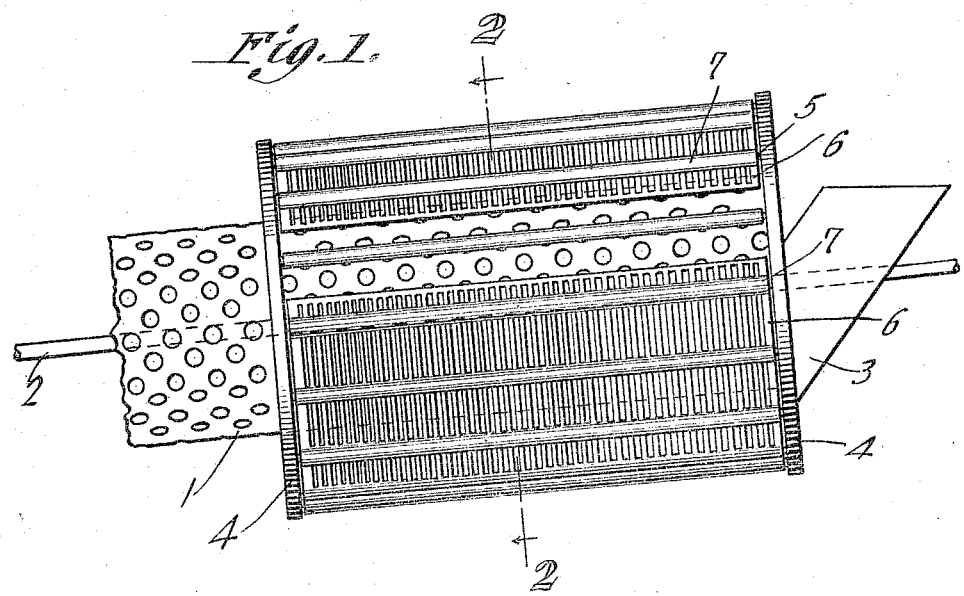
Figure 1 is a side elevation of the screen.
Figure 2:
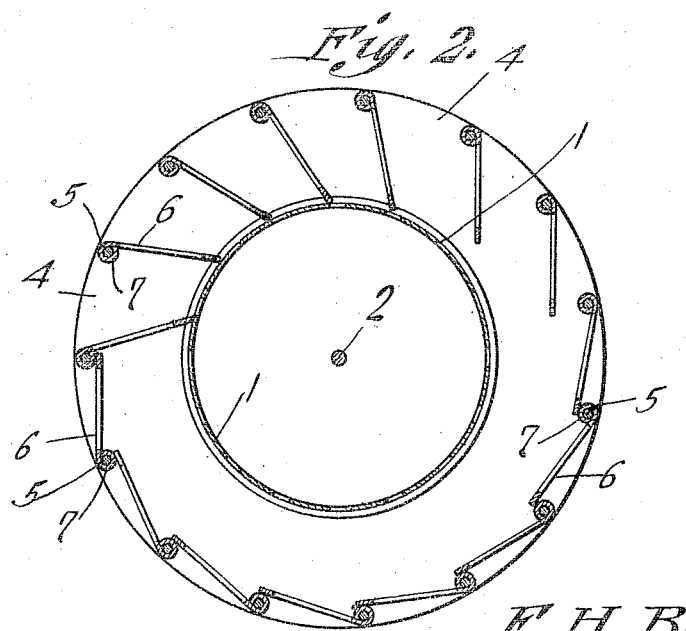
Fig. 2 is a section on line 2—2, Fig. 1.

Referring to the figures by characters of reference, 1 designates a perforated drum mounted for rotation on or with a longitudinal shaft 2 and adapted to be supplied at one end with material from a chute 3. This drum is designed to separate very coarse material from the finer gravel and sand. The drum is surrounded by a supplemental rotary screen which is of novel construction. This supplemental screen includes hoops 4 mounted for rotation and which are connected at regular intervals by parallel rods 5. A plate 6 is mounted to swing on each rod, each plate being perforated to form a screen section and being provided along its outer or rear edge with a sleeve 7 through which one of the rods 5 extends. The plates are so proportioned and the rods 5 are so situated that, during a portion of the rotation of the screen, the free longitudinal edges of the lower plates will rest upon the sleeve 7 of the adjoining plates, as shown in Fig. 2. These lower contacting plates thus coöperate to form a screening surface extending under the drum 1 and adapted to receive small gravel and sand from the drum. The sand will pass through said plates while the gravel will be discharged as tailings.

As each plate 6 passes a vertical position during the rotation of the screen, it will fall inwardly through approximately 45° and its free longitudinal edge will strike violently upon the drum 1, dislodging any material which may be clogging the openings in the plate. The plate will remain in contact with the drum until it descends to a substantially vertical position whereupon it will again come into contact with the sleeve 7 of the next adjoining plate and be supported thereby as it passes under the drum. Thus it will be seen that a simple and efficient self cleaning rotary screen is provided.

What is claimed is:—

1. A rotary inclined screen including a foraminous drum mounted for rotation, and a series of hingedly mounted screen plates extending around and revoluble with the drum, each plate having its advancing edge supported by the next adjoining plate in advance thereof, said plates being tiltable successively into contact with the drum when moved upwardly past their vertical positions, to dislodge the material from the openings in the plate and in the drum.

2. A rotary inclined screen including a drum mounted for rotation, a series of rods spaced from and revoluble with the drum, screen plates having sleeves engaging the rods, the advancing edge of each plate being supported, during the movement of the plate under the drum, by the sleeve of the next adjoining plate in advance thereof, said plates being tiltable successively inwardly against the drum to dislodge material accumulated within openings in the plates and the drum, and to an inverted position when moved past a vertical position during the rotation of the screen.

3. A rotary inclined screen including a drum, a series of screen plates mounted for rotation and extending around the drum, each plate being hingedly mounted and having its advancing edge supported by the next adjoining plate in advance thereof during the movement of the plate under the drum, said plates being successively tilted inwardly through approximately 45° and into violent contact with the drum when moved upwardly past their vertical position to dislodge material accumulated within openings in the plates and drum.

In testimony that I claim the foregoing as my own, I have hereto affixed my signature in the presence of two witnesses.

FITCH H. BEACH.

Witnesses:
M. A. B. ALSENER,
ETHEL SHOTWELL.

Copies of this patent may be obtained for five cents each, by addressing the "Commissioner of Patents, Washington, D. C."